(12) United States Patent
Outten

(10) Patent No.: US 6,257,421 B1
(45) Date of Patent: Jul. 10, 2001

(54) JEWEL BOX HANGER AND SUPPORT

(75) Inventor: Elkin Outten, Freeport (BS)

(73) Assignee: Robert M. Schwartz, Miami, FL (US)

( * ) Notice: Subject to any disclaimer, the term of this patent is extended or adjusted under 35 U.S.C. 154(b) by 0 days.

(21) Appl. No.: 09/512,240

(22) Filed: Feb. 24, 2000

Related U.S. Application Data

(60) Provisional application No. 60/150,503, filed on Aug. 24, 1999.

(51) Int. Cl.$^7$ .................................................. A47F 5/00
(52) U.S. Cl. ........................ 211/40; 211/118; 211/119; 211/85.31; 211/106.1; D7/407; D7/566; 248/303
(58) Field of Search .................... D6/407, 566; 248/303, 248/339; 211/119, 106, 55, 40, 85.31, 118, 56, 106.1

(56) References Cited

U.S. PATENT DOCUMENTS

| | | | |
|---|---|---|---|
| 283,418 | * 8/1883 | Ries . | |
| D. 402,491 | * 12/1998 | Tucker | D6/566 X |
| 904,080 | * 11/1908 | Ovin . | |
| 917,170 | * 4/1909 | Short . | |
| 928,195 | * 7/1909 | Henderson . | |
| 1,235,225 | * 7/1917 | Miller . | |
| 1,438,659 | * 12/1922 | Nailor . | |
| 1,770,190 | * 7/1930 | Andrews . | |
| 2,221,659 | * 11/1940 | Wilkie | 211/119 |
| 2,467,997 | * 4/1949 | Sheker | 248/303 |
| 2,949,510 | * 8/1960 | Sichel . | |
| 5,460,279 | * 10/1995 | Emery et al. | 211/106 |

\* cited by examiner

*Primary Examiner*—Robert W. Gibson, Jr.
(74) *Attorney, Agent, or Firm*—Robert M. Schwartz

(57) ABSTRACT

An apparatus and method for storing, displaying and maintaining CD containers in vertical arrangement while displaying a large portion of the front face or rear face of each CD container in a substantially vertical arrangement slightly overlapped top to bottom, on a wall or other vertical surface with a pair of hangers each having a narrow and elongated body, at one end of which is an open hook part for supporting a portion of the object to be displayed, and at the other end of said body there is a closed hook part.

21 Claims, 7 Drawing Sheets

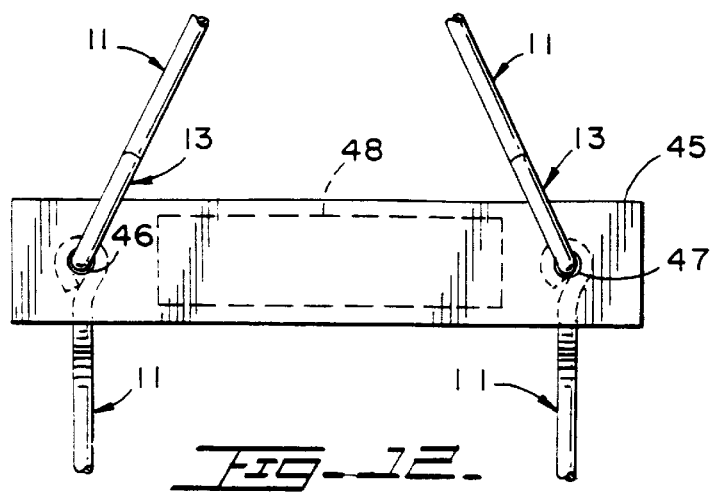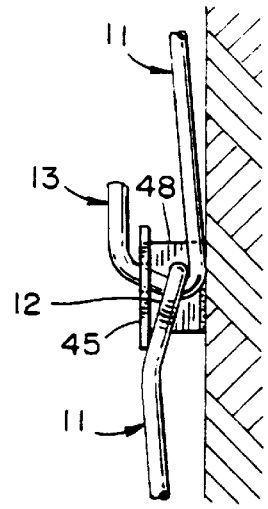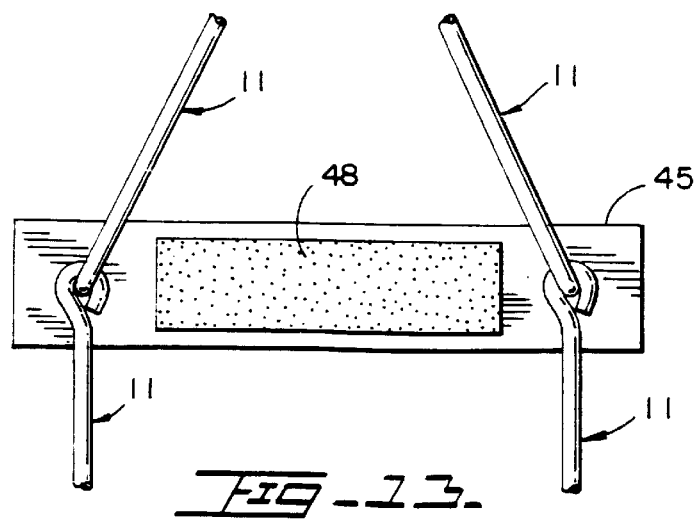

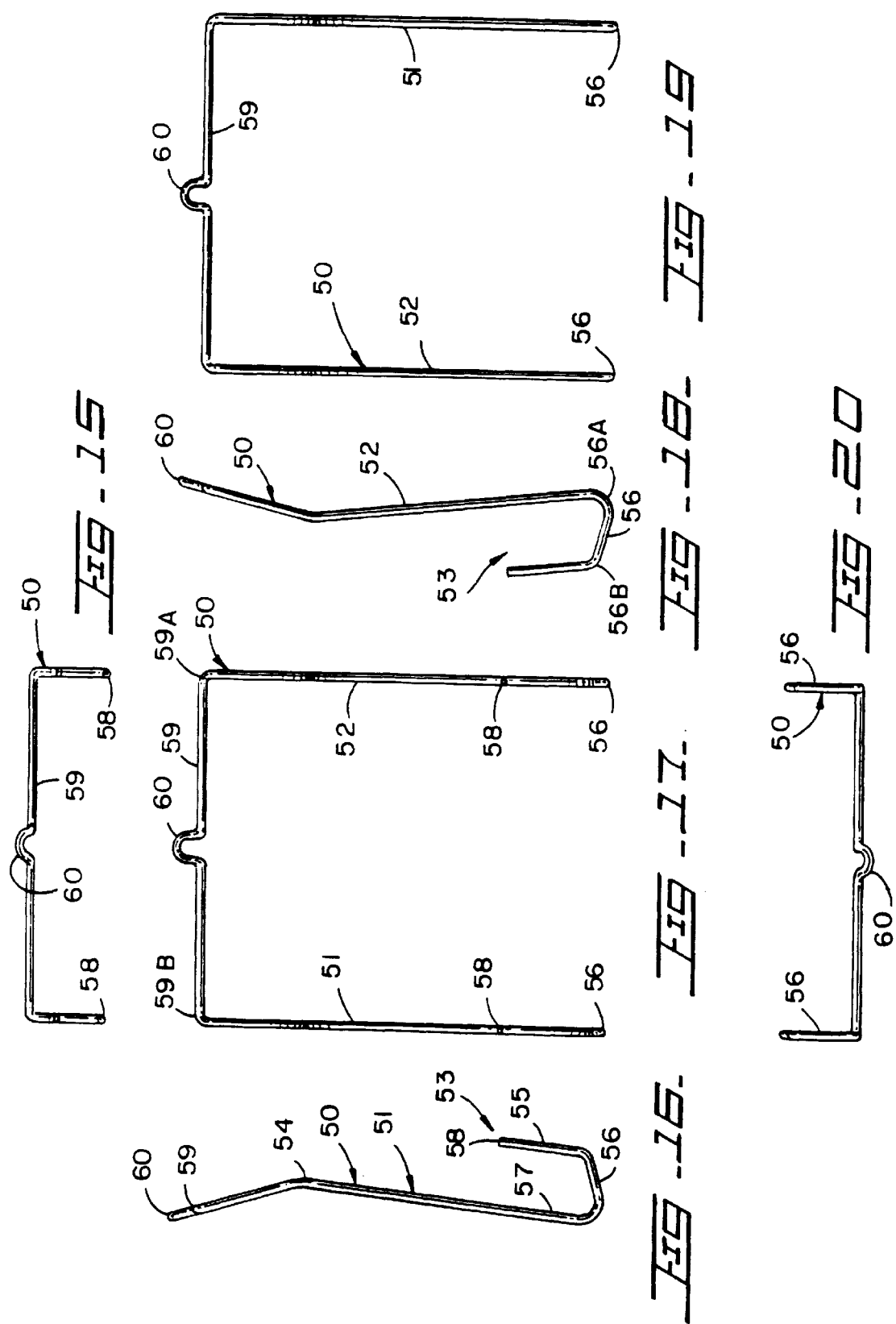

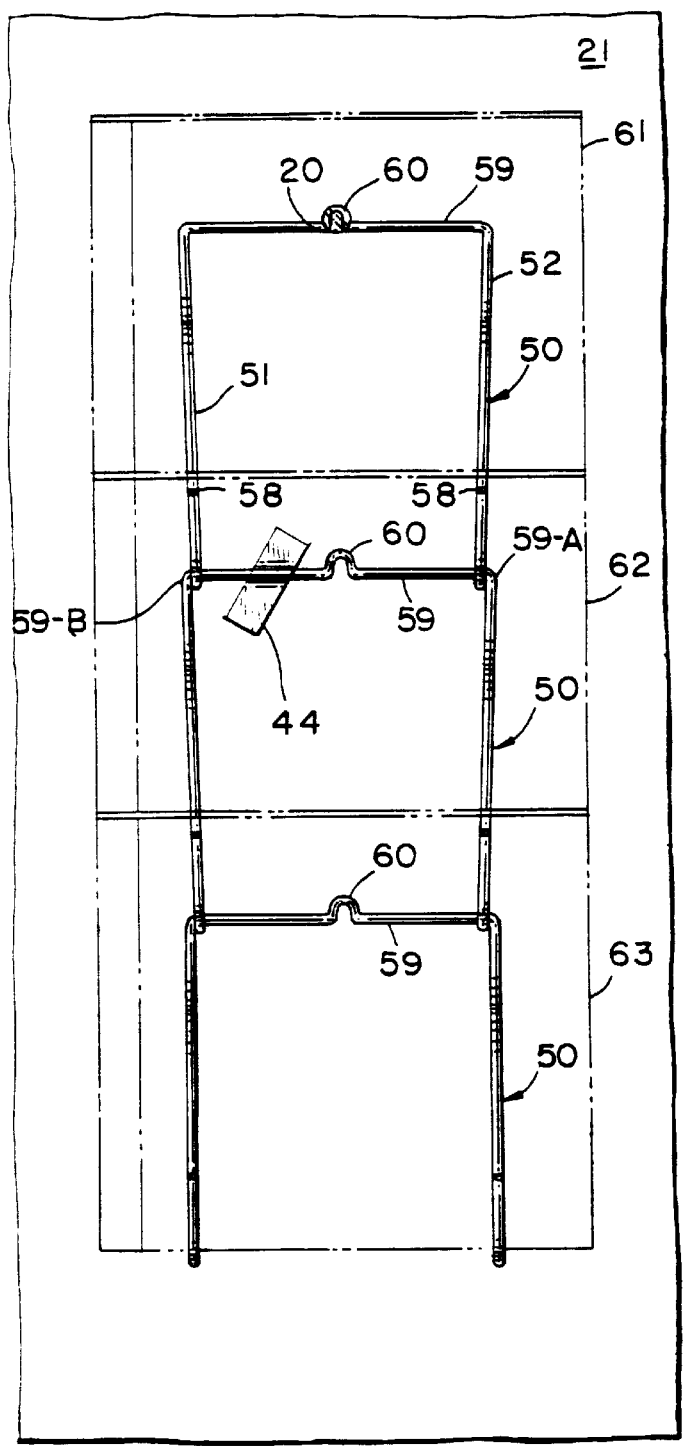
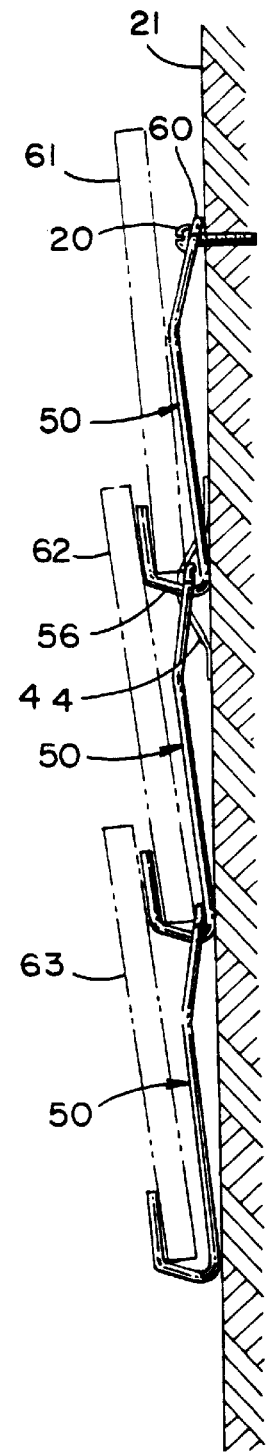
Fig-21.
Fig-22.

JEWEL BOX HANGER AND SUPPORT

CROSS-REFERENCES TO RELATED APPLICATIONS

This application claims the benefit of U.S. Provisional Application No. 60/150,503, filed on Aug. 24, 1999, and U.S. Design Application No. 29/106,500, filed Jun. 16, 1999, entitled CD ROM HANGER HOOK.

PRIOR ART

The prior art includes various means for organizing CD discs (compact disc discs) hereinafter CD, that are usually held and supported within a closable container also referred to as a jewel case. Typically a CD would contain or be capable of containing electronic information. This electronic information may be digital and may include but is not limited to music, computer data, computer information and other data.

A CD container is designed to safely hold one or more CD discs. A standard CD disc is approximately 120 mm (4.75 inches) in diameter and 1.2 mm (0.05 inches) thick. The disc is composed of a clear polycarbonate plastic substrate, a reflective metallic layer, and a clear protective coating of acrylic plastic. The reflective metallic layer is where audio data is read in the form of minuscule (as short as 0.83 micrometre) depressions (pits) and contrasting flat regions (lands) that are arranged in a spiral track (groove) winding from the disc's inner hole to its outer edge. The centres of adjacent grooves are spaced 1.6 micrometers apart. A smaller CD single (80 mm (3.1 inches) in diameter) is also used for audio distribution. The standard CD has a center opening of approximately 15 millimeters.

Typically a CD container, jewel case, is made of clear plastic and has rectangular front and rear faces, and four narrow top, bottom, left and right rectangular sides. The CD container for a single disc has overall front and rear faces of approximately 124 by 142 millimeters, top and bottom sides of approximately 10 by 142 millimeters and right and left sides of approximately 10 by 124 millimeters.

The CD container is designed with a hinged front face portion that opens to expose a CD disc for removal. Typically, since a CD container is made of a clear plastic, information about the CD disc is contained within the CD container and is thus viewable from outside the CD container. Typically this information will be printed on the CD disc itself and/or on inserts such as paper or other thin material, that is placed and held within the CD container so as to be viewable from outside the CD container. This information can be and is exposed on any of the exterior sides and faces of the CD container.

The present invention can also be applied to other devices and apparatus in containers such as audio tape cassette containers, smaller 80 mm CD disc containers and DVD video containers, which may vary in size of the container, depending on the item e.g. tape, DVD disc, contained there within.

A user of CD discs will typically have many of said CD discs and the associated CD containers, ranging from several to several hundred, with each CD disc preferably in its own respective container. In the prior art, there are many storage devices to store, stack and organize CD containers.

Several include a rack to store the CD containers face to face, e.g. the front face of one adjacent and parallel the rear face of the next and so on, either in a vertical or horizontal arrangement as disclosed in U.S. Pat. No. 5,740,924 issued to Thomas A. Hunt.

None of these prior art devices or methods are as simple to display the front face of the CD container or as easy to use as the present invention, or are as simple to use as the present invention or as economical to manufacture as the present invention.

It is an object of the present invention to store CD containers in an organized fashion, in vertical arrangement, while displaying a large portion of the front face of one or more CD containers, on a wall or other vertical fascia.

SUMMARY OF THE INVENTION

The present invention is an apparatus and method for storing, displaying and maintaining CD containers in an organized fashion. The present invention provides a support for hanging CD containers in vertical arrangement while displaying a large portion of the front face or rear face of the CD container. The present invention places the CD containers in a substantially vertical arrangement slightly overlapped top to bottom, on a wall or other vertical surface, with the option of having the front face or the rear face of the CD container facing forward and away from the vertical surface wall for easy viewing.

This is done by first providing a starting point for supporting a first CD container and then supporting an additional CD container from the first support and then supporting other CD containers each from the prior support, in a piggy back fashion one from the other until a desired number of CD containers are hung in a column from the said first support. It is also contemplated that additional first supports will support additional columns of CDs in close proximity to said initial column of CDs.

Several embodiments are shown herein, including the advantages of having only a single part in the manufacture and packaging of the product. In one of these said embodiments all the support members are identical.

In one embodiment of this invention each support element is identical. Said element is a single strand of wire, preferably 18 gauge wire, bent in a shape such that the top end has a closed hook or eye and the opposite end forms an open hook. The height of said element from the top of the top end to the bottom of the bottom open hook is 10.6 centimeters (cm.), the return portion of said bottom hook is 2 cm. and the width of the bottom open hook is 1 cm. The bend is 2.7 cm from the top. These are the preferred dimensions for supporting and holding a CD container in a generally upright position, with desired tilt from the wall and yet close to the wall, when these support elements are used in pairs as described herein.

It is anticipated that additional columns of CDs will be arranged in generally side by side vertical arrangement so as to create a wall of CD containers. Preferably, the starting point of adjacent columns are five and one-half (5½) inches apart, to leave a small gap between adjacent CD containers of adjacent columns. In addition, each column may have a starting point at the same or at different vertical levels from those of adjacent columns.

For a DVD video container holder, the overall height of the hanger would be 19.5 cm, the bend would be 3 cm from the top and the width of the bottom hook would be 1.8 cm. (See FIG. 9).

BRIEF DESCRIPTION OF THE DRAWINGS

FIG. 12. is a partial front view of an alternative cross-member mounted on the base of the splayed pair of supports.

FIG. 13. is a rear view of FIG. 12.

FIG. 14. is a side view of FIG. 12.

FIG. 15. is a top view of an alternate support member with a double hook arrangement.

FIG. 16. is a right side view of the hook of FIG. 15.

FIG. 17. is a front view of the hook of FIG. 15.

FIG. 18. is a left side view of the hook of FIG. 15.

FIG. 19. is a rear view of the hook of FIG. 15.

FIG. 20. is a bottom view of the hook of FIG. 15.

FIG. 21. is a front view of a CD container holder on a vertical wall supporting three CD containers using the hook assembly of FIG. 15.

FIG. 22. is a side view of FIG. 21.

DESCRIPTION OF THE PREFERRED EMBODIMENT

The present invention is an apparatus and method for holding, displaying, stacking and storing CD containers also known as jewel cases. CD rack 10 as seen in FIG. 7. includes one or more pairs of single element hanger 11.

Figure 1:
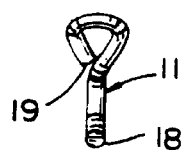
FIG. 1. Is a top view of the single support member.
Figures 2, 3:
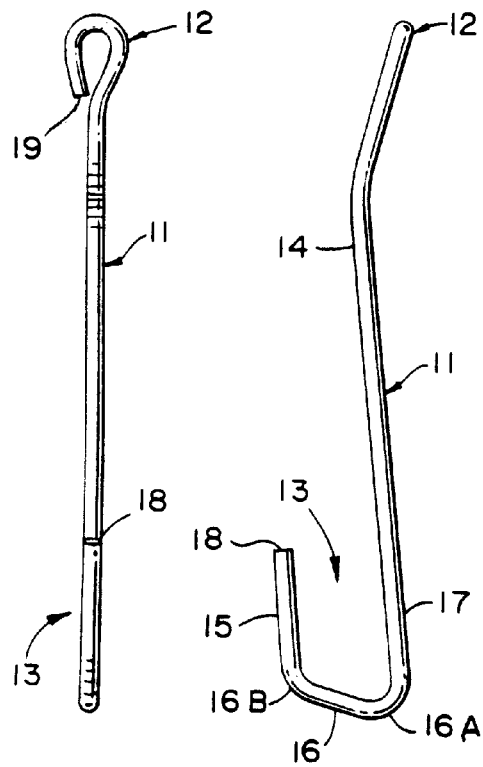
FIG. 2. Is a front view of a single support member.
FIG. 3. Is a left view of a single support member.
Figures 4, 5:
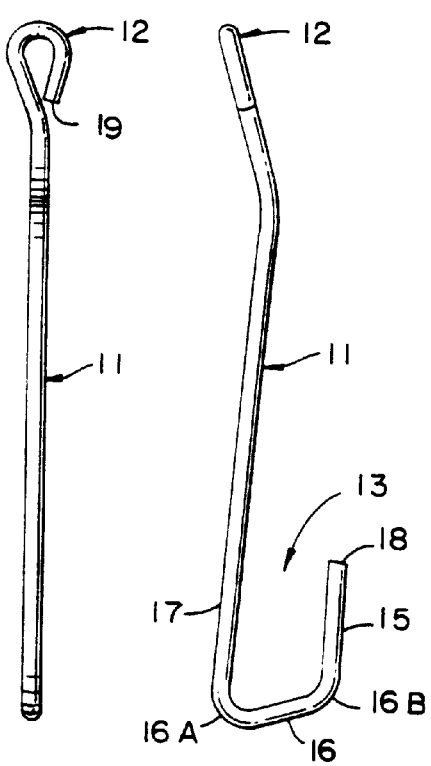
FIG. 4. Is a rear view of a single support member.
FIG. 5. Is a right side view of a single support member.
Figure 6:
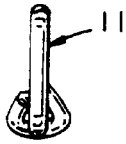
FIG. 6. Is a bottom view of the single support member.

Hanger 11 as seen in FIGS. 1 and 6, is a metal wire of approximately 18 gauge thickness having a generally closed hook or eye 12 at one end and an open hook 13 at the other end of hanger 11. Along the upper length of hanger 11, there is a bend 14, between one inch and one-and-a-half inches from the top of hanger 11. Open hook 13 includes a return portion 15, base portion 16 and shank portion 17. Return portion 15 has a tip 18 which also forms a terminal end of wire hanger 11. The opposite end of hanger 11 is top tip 19. The corner 16A formed by base 16 and shank 17 is slightly lower than the corner 16B formed by base 16 and return 15.

Figure 7A:
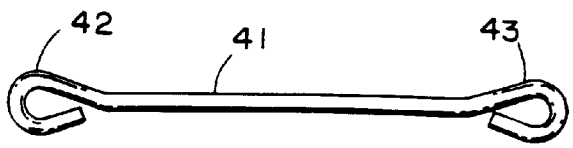
FIG. 7a. Shows cross-bar 41 from FIG. 10.
Figures 7, 8:
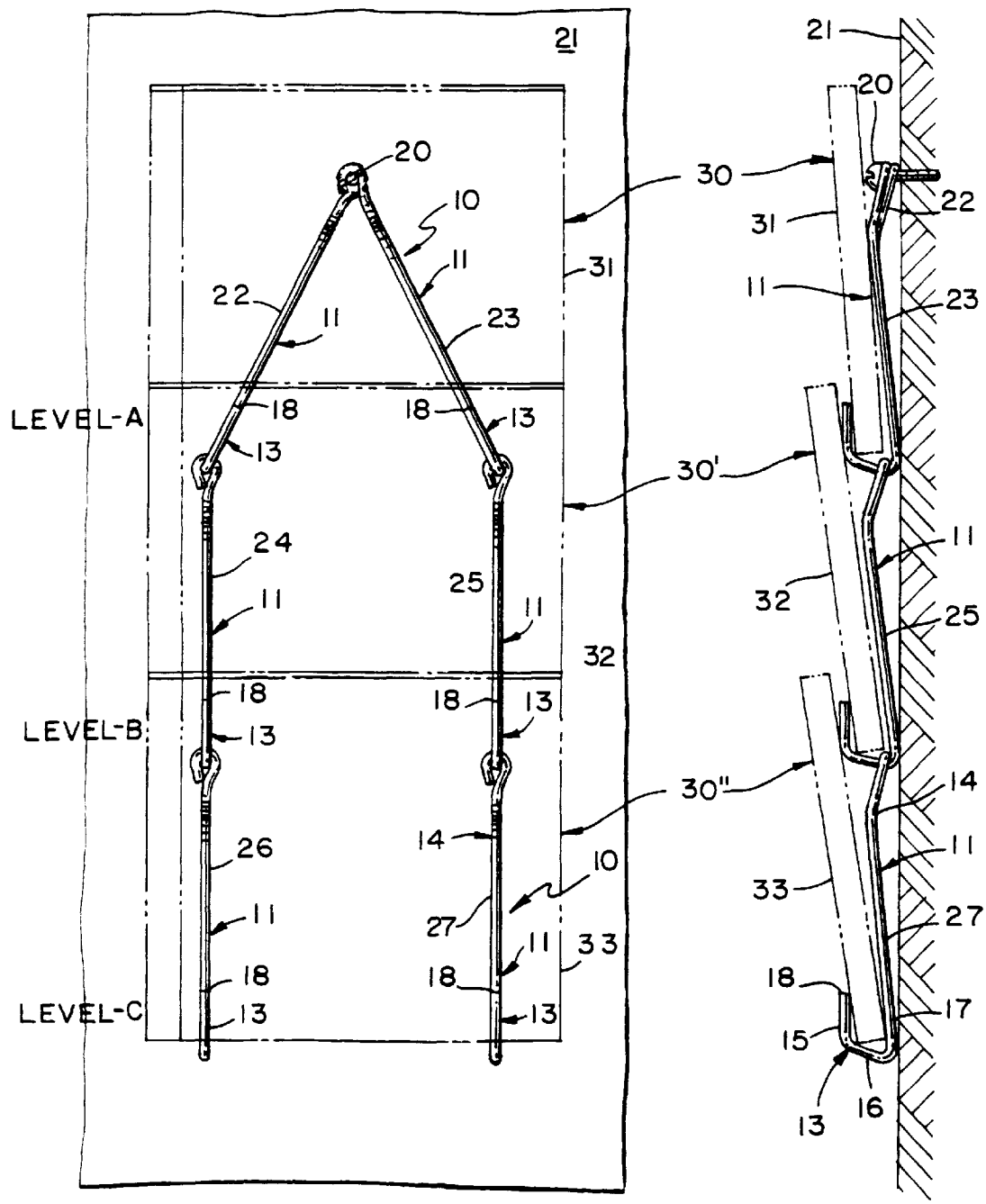
FIG. 7. Is a front view of the present CD container holder on a vertical wall supporting three CD containers.
FIG. 8. Is a side view of FIG. 7.
Figures 9, 9A:
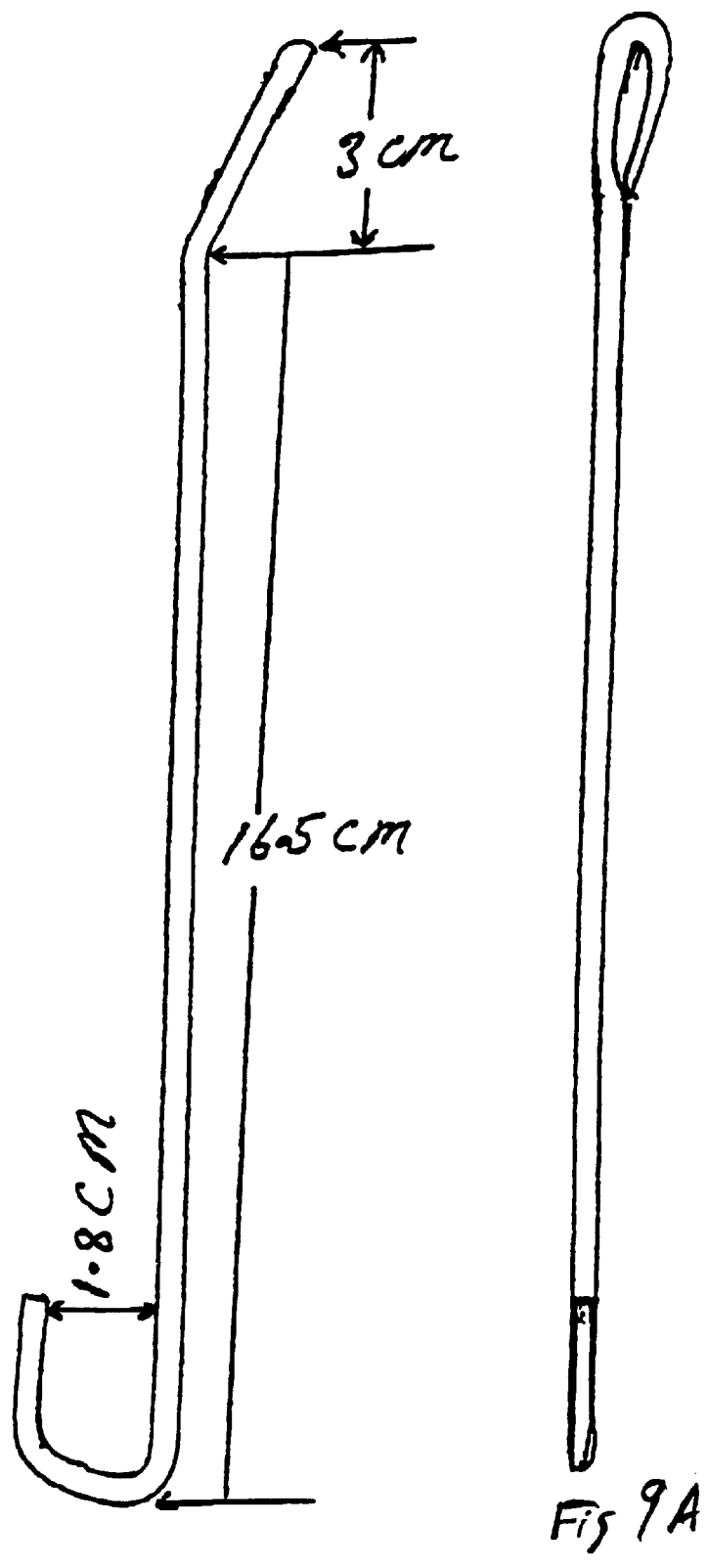
FIG. 9. Is a hanger for a DVD video container.
FIG. 9A. is a front view of FIG. 9.

In use, a first pair of hangers 11 are held together by placing eye 12 of a first hanger 11 aligned with an eye 12 of a second hanger 11 and using a screw 20 or other anchor inserted through both said eyes 12 of first hanger 11 and second hanger 11, to be screwed or otherwise anchored into and against a desired wall 21 or other generally flat vertical surface as shown in FIGS. 7 and 8.

It is desirable for the head of screw 20 to hold, support and exert pressure against eyes 12 of said first hanger 11 and said second hanger 11 firmly against wall 21. It is also desirable to maintain open hooks 13 of said first hanger 11 and said second hanger 11 separated a distance of approximately four (4) inches apart. The force of screw 20 against said eyes 12 and said wall 21 exerts sufficient pressure to maintain said 4 inch distance or any other desired separation of said open hooks 13 of said hangers in a splayed position.

After securing said first pair of hangers 11, additional pairs of hangers 11 may be hung in pairs, from said first pair of hangers 11. Therefore eyes 12 of the next pair of hangers 11 hang from open hooks 13 of the prior pair of hangers 11, to form additional support levels below said first pair of hangers 11 in a piggy back fashion.

A CD container is supported on each pair of hangers 11 as shown in FIGS. 7 and 8, such that the bottom of a CD container is supported by a hook 13 of a hanger 11. Thus the first pair of hangers 11 forms level A to hold a CD container, a second pair of hangers 11 supported from said open hooks 13 of the previous level forms level B. Likewise in piggy back formation, additional levels can be formed by placing additional pairs of hangers 11 of the next pair on the hangers 11 of the previous pair of hangers 11. This forms level C as shown in FIGS. 7 and 8.

Additional levels can be added, subject to the height requirements of the vertical support and the strength of the anchor (screw 20) to support said additional levels. Another words, as seen in FIGS. 7 and 8, a CD container 30 is supported by open hooks 13 from a first pair of hangers 11 at a first level A. A second CD container 30' is supported by open hooks 13 of a second pair of hangers 11 at a second level B. A third CD container 30" is supported by open hooks 13 of a third pair of hangers 11 at a third level C. At each said level, the base portions 16 of open hooks 13 are substantially level to one another to support, maintain and hold a CD container 30 in a level position, such that the bottom portion of each CD container is level.

In use, a desired location is selected on a wall 21 to hang CD rack 10. Referring to FIG. 7, two hangers 11, hangers 22 and 23, are used and eyes 12 of hangers 22 and 23 are aligned with screw 20 which is screwed into a wall (preferably using a screw anchor, not shown in the wall 21, if necessary). Screw 20 is tightened against eyes 12 of hangers 22 and 23 which are arranged such that open hook 13 of hanger 22 is separated by about 4 inches from open hook 13 of hanger 23 in a splayed fashion, with both said hooks 13 level. A single CD container 31 can now be supported by hangers 22 and 23 on wall 21.

Preferably additional CD containers will be desired to be displayed and supported. Prior to placing CD container 31 in place, additional pairs of hangers 11 can be hung from the first pair of hangers 22 and 23. Thus, hanger 24 is hung from hanger 22 by placing eye 12 of hanger 24 on open hook 13 of hanger 22. Likewise, eye 12 of hanger 25 is placed on hook 13 of hanger 23. Additional pairs of hangers can be added by placing eye 12 of the next lower hanger on hook 13 of the previous upper hanger. Thus, eye 12 of hanger 26 is placed on hook 13 of hanger 24, and eye 12 of hanger 27 is placed on hook 13 of hanger 25.

In this arrangement, the base portions 16 of each pair of hangers 22 and 23, hangers 24 and 25, and hangers 26 and 27 are parallel and level with one another to support the desired CD containers in a level position. As described, CD container 31 is supported in a level position on hooks 13 of hangers 22 and 23, CD container 32 is supported in a level position on hooks 13 of hangers 24 and 25, and likewise CD container 33 is supported on hooks 13 of hangers 26 and 27.

This example describes three CD containers supported in a single CD rack 10 from a beginning starting point located at or near screw 20. As many CD containers as desired can be supported in vertical arrangement as heretofore described by the user and subject to vertical wall space requirements from the starting point to the bottom of the vertical wall space.

It is also envisioned that multiple columns of CD containers on CD racks 10 can be arranged, one column adjacent another. Said columns may have starting points at one vertical level or the starting points can be staggered along the vertical surface depending on the user's design. It is preferred to place the starting points of adjacent columns five and one-half (5½) inches apart to create a reasonable space between said adjacent CD containers of approximately one-quarter to one-half (¼ to ½) inches.

Figure 10:
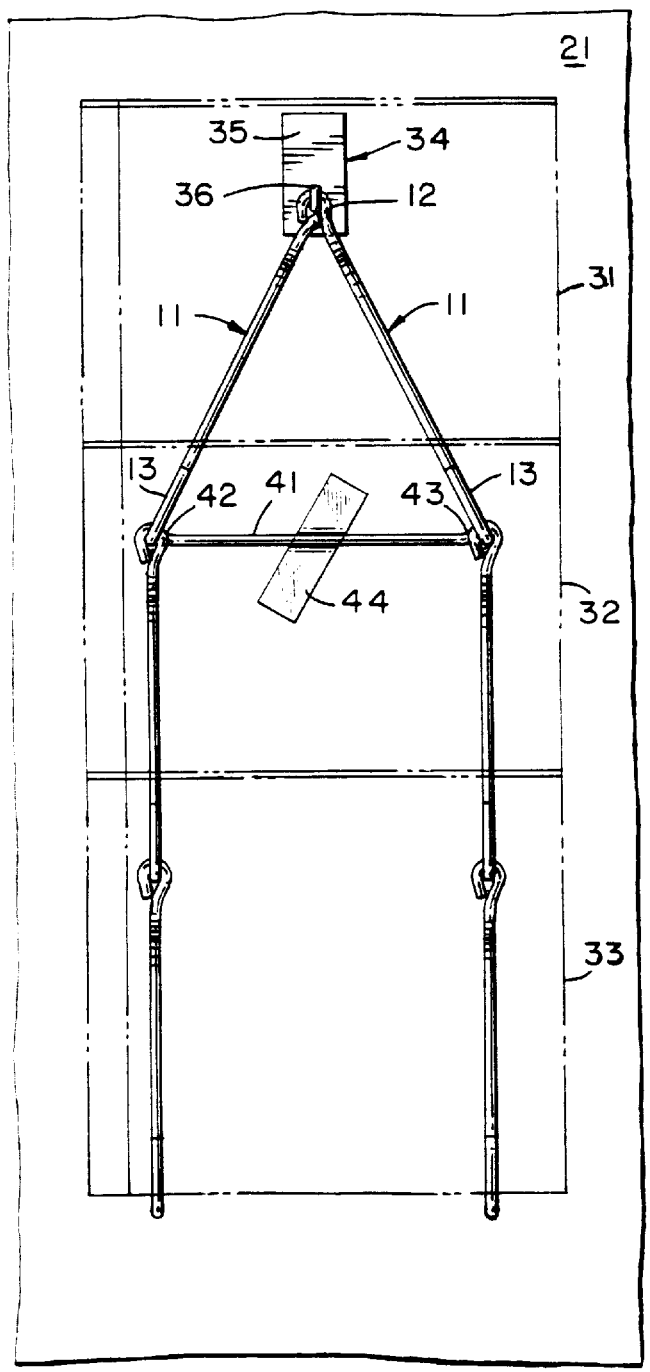
FIG. 10. is a front view of an alternate embodiment having a cross-member and an adhesive hook.
Figure 11:
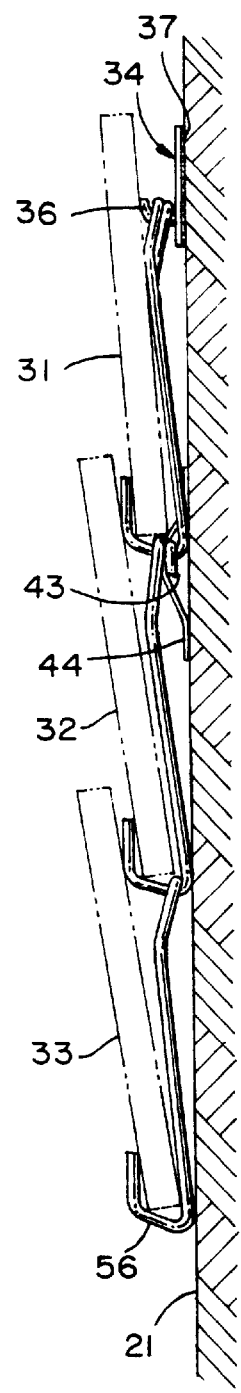
FIG. 11. is a side view of FIG. 10.

In an alternative embodiment, a cross-bar member may be provided to maintain a space between two horizontally aligned hangers 11. FIGS. 10 and 11 show the relative arrangement of a cross-bar member 41, of one embodiment. It is desirable to attach hangers 11 to one another in such a way as to enhance the stability of CD hanger 10. In addition it is found, as shown in FIGS. 10 and 11, that the anchor 20 for the starting point of the CD hanger 10 can also be a hook with an adhesive backing, shown as wall hook 34. Said wall hook 34 includes a flat frontal portion 35 having an extending J-shaped support 36, arranged generally perpendicular to frontal portion 35 to support hangers 11 where J-shaped support 36 will thread eyes 12 of hangers 11. The rear portion of wall hook 34 includes an adhesive backing 37 such that wall hook 34 is securely adhered to wall 21. An example of a preferred wall hook 34 is manufactured by the 3M Company (Minnesota Mining & Manufacturing Co., St. Paul, Minn.) under the trademark Command which allows the adhesive to be attached to the wall and includes a pull tab so that the wall hook 34 is easily removed from said wall 21.

In this alternative, since eye 12 of hangers 11 of FIG. 10 are not compressed against the wall as in the previously described embodiment where a screw 20 was used, it is necessary in order to maintain the splay of the first pair of hangers 11, to use said bracket 41.

Bracket 41 includes a pair of closed hooks (eyes) 42 and 43 at each of its ends. As shown in FIG. 7a, cross-member 41 includes at one end an eye 42, and at its opposite end an eye 43.

Referring to FIG. 10, when the eyes 12 of the first pair of hangers 11 are placed on J-shaped support 36, cross-bar member 41 is held in place on open hooks 13. The cross-member 41 maintains the separation between the hook portions 13. Thereafter, additional pairs of hangers 11 are hung from the respective hangers 11 as heretofore described.

To further enhance the stability of the arrangement shown in FIG. 10, a piece of adhesive tape 44 is placed over said cross-bar member 41 adhering said cross-bar member 41 to vertical wall surface 21. This increases the stability of the arrangement of the first pair of hangers 11 in the embodiment where a screw 20 or other anchor is not used to securely maintain pressure against eyes 12 at the top of hanger 10.

In another embodiment of this invention said cross-bar member is manufactured from a flat, elongated plastic or similar material, with a thickness of approximately 0.5 mm to 2.0 mm and dimensions of 2.5 mm by 10–11 mm long. Referring to FIGS. 12, 13 and 14, this flat cross-bar member 45 includes a pair of openings 46 and 47 at opposite ends of said flat cross-bar member 45. These openings 46 and 47 allow flat cross-bar member 45 to fit over the hooks 13 of hangers 11. Flat cross-bar member 45 is positioned over hangers 11 before an eye 12 from an additional hanger 11 is added. Further, additional flat cross-bar members 45 may be added at each level or at intermittent levels (e.g. every other level, every third level, etc.) or cross-bar members may preferably be only positioned with the top pair of a series of hangers 11. The ultimate positioning of the cross-bar members 45 is left to the user and the only determining factor is the level of enhanced stability that is preferred.

To further enhance stability, flat cross-bar member 45 may be affixed to wall 21. Any number of fixation methods may be used, by way of example only, one may use: adhesive, screws, nails, putty, tape, etc.

A preferred method of fixation is the use of foam double-sided tape 48 of the type that is readily available and relatively inexpensive. As can be seen in FIG. 12, 13 & 14, double-sided tape 48 is applied to the flat cross-bar member 45, to securely hold hangers 11 in place. In this embodiment, a wall hook 34 can be used as previously described, or a nail can be used for the starting point and as an anchor 20. The nail as an anchor 20 would provide the least intrusion on or into wall 21.

In the embodiments heretofore described, other than the cross-bar member or the flat cross-bar member, the hanger represented only a single item to be manufactured to use the hanger assembly 10 of the present invention. In the alternate embodiments in FIGS. 15 through 20, and FIGS. 21 and 22, a hanger assembly is shown with two hooks, one on each side, and a center support. These embodiments also represent use of a single part for using the hanger 10 assembly.

As best seen in FIGS. 15 through 20, a double-hook hanger 50 having a pair of hook members 51 and 52. Each hook member 51 and 52 has at its lower end an open hook assembly 53 substantially identical to open hook assembly 13 previously described, with a bend 54, return portion 55, base portion 56, shank portion 57, tip 58. At the opposite end of hook members 51 and 52, is an integral cross-member 59, which supports and maintains the distance between the respective said hook members 51 and 52. An open eye 60 to support a nail 20 is centered on cross-member 59.

In use, and referring to FIGS. 21 and 22, a screw 20 or a nail or other anchor 20 is secured into wall 21 as the starting point. From said anchor, a double hook hanger 50 is supported from said anchor at open eye 60. A jewel box is placed in said double hook hanger 50 whereby the bottom of said jewel box is supported by base 56 and return 55 and shank 57 of said double hook hanger 50 at each of said parallel hook members 51 and 52. If it is desired to hang additional jewel boxes therefrom, prior to placing the first jewel box 61, additional double hook hangers 50 will be hung one from the other as shown in FIG. 21 whereby a second double hook hanger 50 will be placed on the open hook portions 53 of said first double hook hanger 50 such that corner 59a will reside on portion 56a of hook 52 and 59b will rest at corner 56a of hook member 51. Additional double hook hangers can be suspended one from the other as heretofore described to a desired length by the user. Again in this embodiment, a single shaped double hook hanger can be simply manufactured to hold each of the jewel cases. As shown in FIG. 21, a tape 61 can be placed across the second integral cross member 59 to increase the stability of hanger 10. This is done by placing said tape 61 on wall 21 the adhesive portion of tape 61 over said integral cross member 59 against wall 21.

Additional CD jewel cases 62 and 63 along with the original CD jewel case 61 are shown supported in this embodiment in FIGS. 21 and 22. It can further be noted that to further maintain rigidity in the system using double hook hanger 50, the lower ends of hook members 51 and 52 will be compressed toward one another when the next double hook hanger 50 is placed over the open hook portions 53 so that the base 56 of each hook member 51 and 52 will fit within corners 59a and 59b of double hook hanger 50 to be supported. The lower double hook hanger 50 is supported and held by the upper double hook hanger 50.

In the embodiments described above, and as seen in FIGS. 8, 11 and 22, a face of a jewel case is facing forward and away from vertical wall 21. Furthermore it can be seen that a large portion of the face of each jewel case is fully exposed to view whatever information that may be displayed on or within said Jewel case face.

What is claimed is:

1. A plurality of support elements for use in a vertical hanging rack for displaying objects, each said support element comprising:
   a narrow and elongated body, at one end of which is an open hook part for supporting a portion of the object to be displayed, and at the other end of said body there is a closed hook part;
   a first pair of said support elements having said closed hook parts thereof juxtaposed;
   said open hook parts being splayed with respect to each other to define two supporting portions for the same object to be displayed;
   a second pair of said support elements;
   said closed hook part of each said support element of said second pair being hooked upon said open hook part of a respective different one of said first pair of support elements and thereby depending vertically therefrom;
   each support element of said second pair thereby being positioned parallel to and spaced apart from the other, thus forming a vertical support, with two spaced apart supporting portions, for a second object to be displayed by said rack.

2. The support elements according to claim 1, in which said closed hook and open hook parts are at the upper and lower ends respectively of said narrow and elongated body; and said open hook part has a base, the depth of which accommodates lower surfaces of an object to be displayed.

3. The support elements according to claim 1, in which said elongated body has a stand off part, which is positioned between said open and closed hook parts; whereby, when said closed hook part is mounted to a vertical backing, said elongated body, between said stand off and open hook parts, is disposed at an angle less than vertical.

4. Support elements according to claim 1, in which said closed hook parts of said first pair are superimposed to enable a fastener to pass there-through for securing said first pair of support elements to a backing, for the vertical hanging of said supports, to form a top level of said hanging rack.

5. A first pair of support elements according to claim 1 and a cross brace mounted to said open hook parts to hold them splayed.

6. The support elements according to claim 1 in which said open hook object supporting parts of each said pair of support elements lie along a horizontal plane; whereby, the objects to be displayed will be supported horizontally and generally vertically.

7. The support elements according to claim 1 in which said body is of wire, which is bent to form said closed and open hook parts.

8. A support element according to claim 3 in which said stand off is defined by a bend in said elongated body, and said bend is closer to said closed hook than to said open hook part.

9. The support elements according to claim 1 in which said body has a top part disposed generally at right angle to the remainder of said body; and said closed hook part is at the middle of said top part.

10. A first pair of support elements, each support element as defined in claim 9, said closed hook parts thereof being juxtaposed and said open hook parts lying parallel to each other to define two supporting portions for the same object to be displayed; and said two supporting portions lying along a common horizontal plane.

11. A first pair of support elements as defined in claim 10 in which said top parts are unified; whereby only one of said closed hook parts is needed for receiving fastening means for mounting said first pair of support elements to a vertical backing.

12. An apparatus for holding, displaying, stacking and storing containers comprising:
   (a) at least four single element hangers; and
   (b) one or more cross-bar members; said single element hangers each having a closed hook top portion and an open hooked bottom portion, so as to facilitate the interface of said closed hook top portion of one of said hangers with said open hook bottom portion of another of said hangers to form two columns of said single element hangers in such a way as to support therebetween two containers, said two columns connected to one another by a substantially horizontal arrangement of said one or more cross-bar members; and wherein at least one of said one or more cross-bar members is affixed to a mounting surface.

13. An apparatus as claimed in claim 12 wherein said one or more cross-bar members are affixed to said mounting surface with double-sided tape.

14. A pair of support elements, in combined use, for supporting an object in a vertical hanging rack which is for displaying similar objects, each such object having a box-like shape, with a significant depth and width, each said support element comprising:
   a narrow and elongated body, at the bottom end of which is an open hook part for supporting a lower portion of an object to be displayed, and at the top end of said body there is a closed hook part;
   said open hook part has a front facing short leg, a long back leg and a base connecting said legs;
   said base has a depth which accommodates the depth of the lower portion of the object, such that said pair of open hook parts support the front and back surfaces of the object near its bottom by surface contact with said front and back legs; whereby
   when said pair of closed hook parts are mounted to a vertical backing, with said pair of open hook parts spaced apart by a distance less than the width of the object and said bases of said hook parts lie along a horizontal plane, the object is supported parallel to that horizontal plane and the object is disposed at an angle less than vertical.

15. The pair of support elements according to claim 14 and, in combination therewith;
   a second, similar pair of said support elements, having the same said body and hook parts;
   said closed hook part of each said support element of said second pair being hooked upon said open hook part of a respective different one of said first pair of support elements;
   each support element of said second pair thereby being positioned parallel to and spaced apart from the other, and thus forming, with said open hook parts, two spaced apart supporting portions, for a second object to be displayed by said rack.

16. The support elements combination according to claim 15 and
   a cross brace mounted between said first pair of support elements to hold them space apart.

17. A method for displaying a plurality of objects, each object having front, back, top and bottom surfaces and a pair of bottom edges defined by the junction of the front, bottom and back surfaces;

said method resulting in the objects hanging in a depending relationship to each other, from a starting point on a generally flat, vertical structure, said method comprising the steps of:

selecting a starting point on the structure;

attaching an anchor to the structure at the starting point;

hanging a first pair of similar, elongated hangers from said anchor, each hanger having top and bottom ends and a body lying therebetween, said hanging being from the top end of each hanger;

maintaining at least the bottom ends of the hangers in significantly spaced apart relation to each other;

defining, by the bottom ends of the pair of hangers, vertical support for one of the objects, those bottom ends being configured as open hooks having a front facing short leg;

said step of defining vertical support being provided by the open hooks having bearing surfaces for at least two of a bottom edge, the front surface and the back surface of the object;

said method not requiring lateral supporting of the objects for their displaying; and said steps of displaying causing the front surface of each object to be other than parallel to vertical structure to which the anchor is attached.

18. A method of displaying according to claim 17, including the further steps of:

joining, in depending orientation, the top ends of a second pair of the hangers from the bottom ends of the first pair of hangers and also maintaining the spaced apart relation of the bottom ends of the hangers of the second pair; and positioning a second object to be displayed into the open hooks of the second pair, such that the front surface of the second object lies parallel to the front surface of the object supported by the first pair of hangers and thereby other than vertical.

19. The method of displaying according to claim 17, in which said step of maintaining the spaced apart relation of the bottom ends of the hangers is accomplished by, attaching cross bracing between the hangers of a pair of hangers.

20. The method of displaying according to claim 19, in which said step of attaching cross bracing is accomplished by, securing the cross bracing to the anchor.

21. The method according to claim 18 including the step of placing the top of the second object in front of the open hooks of the first pair of hangers.

* * * * *